(12) United States Patent
Widmer et al.

(10) Patent No.: US 11,356,323 B2
(45) Date of Patent: Jun. 7, 2022

(54) CONFIGURATION DEVICE AND METHOD FOR CONFIGURING DATA POINT COMMUNICATION FOR AN INDUSTRIAL SYSTEM

(71) Applicant: Hitachi Energy Switzerland AG, Baden (CH)

(72) Inventors: Theo Widmer, Birmenstorf (CH); Thorsten Schumann, Zürich (CH)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 16/894,366

(22) Filed: Jun. 5, 2020

(65) Prior Publication Data
US 2020/0389353 A1    Dec. 10, 2020

(30) Foreign Application Priority Data
Jun. 7, 2019 (EP) .................................. 19179148

(51) Int. Cl.
G06F 15/177 (2006.01)
H04L 41/0803 (2022.01)
H04L 41/084 (2022.01)
H04L 41/08 (2022.01)

(52) U.S. Cl.
CPC ...... *H04L 41/0803* (2013.01); *H04L 41/0843* (2013.01); *H04L 41/0886* (2013.01)

(58) Field of Classification Search
CPC ............ H04L 41/0803; H04L 41/0843; H04L 41/0886

USPC .................................................. 709/203, 220
See application file for complete search history.

(56) References Cited

U.S. PATENT DOCUMENTS

| | | | |
|---|---|---|---|
| 2002/0059477 A1 | 5/2002 | Wimmer et al. | |
| 2008/0256079 A1 * | 10/2008 | Saha | H04L 67/1008 |
| 2010/0020724 A1 | 1/2010 | Wimmer et al. | |
| 2012/0185436 A1 * | 7/2012 | Lee | G06F 3/00 707/640 |
| 2014/0282021 A1 * | 9/2014 | Dolezilek | H04L 41/12 715/735 |
| 2019/0129392 A1 | 5/2019 | Gerspach et al. | |
| 2020/0329113 A1 * | 10/2020 | Carofiglio | H04L 12/1886 |
| 2020/0374232 A1 * | 11/2020 | Fox | G06N 3/04 |

FOREIGN PATENT DOCUMENTS

| | | |
|---|---|---|
| EP | 1191662 A1 | 3/2002 |
| EP | 2859684 A1 | 4/2015 |
| WO | 2013182244 A1 | 12/2013 |

* cited by examiner

*Primary Examiner* — Duyen M Doan
(74) *Attorney, Agent, or Firm* — Slater Matsil, LLP

(57) ABSTRACT

A method is provided for configuring communication of data points from producers of data points of an industrial automation control system, power distribution system, power generation system, and/or power transmission system to a consumer of data points. The method includes receiving, by a configuration device, information on required data points. The required data points are a subset of all available data points and are the set of data points required by the consumer of data points. The configuration device automatically determines a communication configuration of data points for transmission of the required data points from the producers to the consumer.

20 Claims, 4 Drawing Sheets

CONFIGURATION DEVICE AND METHOD FOR CONFIGURING DATA POINT COMMUNICATION FOR AN INDUSTRIAL SYSTEM

CROSS-REFERENCE TO RELATED APPLICATIONS

This application claims priority to European Patent Application No. 19179148.2, filed on Jun. 7, 2019, which application is hereby incorporated herein by reference.

TECHNICAL FIELD

Embodiments relate to a configuration device and method for configuring data point communication for an industrial system.

BACKGROUND

Modern power utilities, such as power generation systems, national or regional power grids, or substations, and modern industrial systems include a vast number of components, sensors, and intelligent electronic devices (IEDs). Control centers or local human machine interfaces (HMIs) may be provided to assist operators in the complex task of monitoring and/or controlling the operation of a power utility or industrial system.

Data points provided by IEDs or other components may be communicated to the control center or local HMI where information on operating states and conditions can be displayed or otherwise processed.

Configuring the devices of the system for the transmission of such data points from a data point producer (such as an IED) to a data point consumer (such as a control center or local HMI) is a complex task. The protocol configuration of data points, i.e., the process of determining the protocols used for transmission of data points and the respective transmission path is conventionally done manually.

A significant increase in data points was observed within the last decade. This increase is assumed to continue. This renders the manual protocol configuration a complex task which is time-consuming and prone to errors. For illustration, even when assuming error rates of 0.2 to 0.4% for manual configuration, there is a significant risk of incorrect protocol configurations for data point transmissions when the number of available data points is in excess of 1000, as is the case in many modern applications.

A manual data point protocol configuration is often performed independently of the needs of a control center or local human machine interface, and covers all available data points. There is a risk that the configuration is incomplete and that this error is not discovered at an early stage of an engineering process.

Conventional data point protocol configuration techniques do not lend themselves to conversion from one protocol to another protocol. Communication implementations (particularly on the application layer, i.e., relating to protocol) can change often, and conversion of the data point protocol configuration can be a complex task.

Techniques that assist an engineer in configuration or commissioning tasks are disclosed in, e.g., European patent document EP 1191662 A1 and US Pat Pub No 2010/020724.

SUMMARY

Embodiments of the invention relate to methods and devices that facilitate the process of configuring devices for the communication of data points. Particular embodiments relate to methods and devices that can be used to facilitate the configuration process of IEDs and other devices for a transmission of data points from producers of data points to consumers of data points in an industrial automation control system, power generation system, power distribution system, and/or power transmission system.

Embodiments of the invention can provide improved methods and devices that facilitate the task of configuring devices for the transmission of data points. For example, embodiments provide such methods and devices that reduce the amount of human engineering work required for configuring data point communication or at least certain aspects thereof. Embodiments provide methods and devices that are less error-prone than conventional techniques, that take into account the protocols supported by intelligent electronic devices (IED(s)), clients, switches, and other nodes, and/or that facilitate testing the data point communication configuration for completeness and correctness.

Embodiments of the invention can use information on data points required by a consumer of data points and on data points provided by producers of data points in combination with information on protocol stack capabilities to automatically determine the communication configuration of data points for the required data points.

Embodiments of the invention can require user input only for information which remains invariable over longer time periods and/or is commonly available in end users. Information on the data points required by a consumer is exemplary for such information.

Expert knowledge can be used to automate the parts of configuration process which is more short-lived. The data point protocol configuration is exemplary for such a configuration process that can be automated using expert knowledge implemented in a configuration device.

Embodiments of the invention can determine the data point communication configuration based on basic protocol stack capabilities. Templates with user-specific implementations such as proprietary addressing schemes may optionally be used.

The configuration can be performed starting from the data points required by a consumer rather than based on an independent list of data points that is available from all producers of data points. This minimizes the risk of omitting data points in the protocol configuration process. The data point communication configuration process can be limited to those data points that are actually required by a consumer.

Embodiments of the invention allow a configuration of all links between data point producers and a data point consumer to be performed concurrently, thereby further reducing the risk of errors.

According to an embodiment, a method of configuring communication of data points from producers of data points of an industrial automation control system, power distribution system, power generation system, and/or power transmission system to at least one consumer of data points is provided. The method comprises receiving, by a configuration device, information on required data points, the required data points being a subset of all available data points and being the set of data points required by the at least one consumer of data points. The method comprises automatically determining, by the configuration device, a communication configuration of data points for transmission of the required data points from the producers to the at least one consumer.

Automatically determining the communication configuration of data points may comprise determining a transmission path for each of the required data points, based on protocols supported by the producers, the at least one consumer, and nodes traversed on a transmission path from the producer to the at least one consumer.

Automatically determining the communication configuration of data points may comprise automatically determining protocol parameters and protocol services. The protocol parameters and protocol services may be defined by software and/or interfaces of the sources, consumers, and intermediate nodes along a transmission path.

Determining the communication configuration of data points may comprise identifying protocols supported by nodes along at least one candidate transmission path from a producer of a required data point to the at least one consumer.

Determining the communication configuration of data points may comprise selecting a transmission path based on the supported protocols.

The method may comprise automatically generating configuration data for the nodes along at least one of the candidate transmission paths.

The configuration data may include configuration files.

The configuration files may be generated based on a template.

The template may reflect a proprietary addressing scheme.

The communication configuration of data points may be determined based on protocol stack capabilities.

All communication links between the producer of a required data point and the at least one consumer may be configured concurrently.

The at least one consumer may comprise a human machine interface.

The at least one consumer may comprise a control center.

The control center may be a device or system at which information of several substations and/or several power generation plants and/or several industrial plants is received and processed. The control center may be a device or system that is operative to control several substations and/or several power generation plants and/or several industrial plants.

The control center may be a national control center or a regional control center of a power system.

The control center may be a device or system that is operatively coupled to several gateways or human machine interfaces (HMI) to receive data points therefrom.

The method may further comprise outputting, by the configuration device, data point information on data points that are available from at least one of the producers of data points.

Receiving the information on required data points may comprise receiving a user selection from the data point information.

The data point information output by the configuration device may include graphical markings indicating data points for which receipt by the at least one consumer is compulsory and data points for which receipt by the at least one consumer is optional.

The producers of data points may comprise IEDs.

The producers of data points may comprise sensors.

The producers of data points may comprise merging units.

The data points may include values of electric current.

The data points may include voltages.

The data points may include switch states.

The data points may include motor states of circuit breakers.

The data points may include a value and a time stamp.

The data points may include quality information.

The communication configuration of data points can be automatically generated when IEC 61850-based protocols are involved and when no IEC 61850-based protocols are involved.

Automatically determining the communication configuration of data points may comprise generating the configuration data for the producers, optional intermediate nodes, and the at least one consumer such that at least one required data point is transmitted using a protocol in accordance with IEC 61850 over at least part of its transmission path.

Automatically determining the communication configuration of data points may additionally or alternatively comprise generating the configuration data for the producers, optional intermediate nodes, and the at least one consumer such that at least another required data point is transmitted using a protocol that is not in accordance with IEC 61850 over at least part of its transmission path.

The method may comprise receiving, by the producers of data points, the configuration data generated by the configuration device.

The method may comprise transmitting, by the producers of data points, the required data points using a protocol defined by the configuration data.

The method may comprise receiving, by intermediate nodes of a transmission path for the required data points, the configuration data generated by the configuration device The method may comprise receiving, by the intermediate nodes, the required data points using a protocol defined by the configuration data, and transmitting, by the intermediate nodes, the required data points using a protocol defined by the configuration data. The protocols for receiving and transmitting may be different.

The communication configuration of data points for the required data points may be determined prior to runtime of the industrial automation control system, power distribution system, power generation system, and/or power transmission system.

The communication configuration of data points for the required data points may be determined prior to installation of the industrial automation control system, power distribution system, power generation system, and/or power transmission system.

The method may be executed in the process of engineering, configuring or commissioning the industrial automation control system, power distribution system, power generation system, and/or power transmission system or subsystems or components thereof.

According to another embodiment, there is provided a computer program comprising instructions which, when the program is executed by at least one integrated circuit of a configuration device, cause the configuration device to carry out the method according to an embodiment.

A configuration device according to an embodiment is adapted to configure communication of data points from producers of data points of an industrial automation control system, power distribution system, power generation system, and/or power transmission system. The configuration device comprises an interface operative to receive information on required data points, the required data points being a subset of all available data points and being the set of data points required by at least one consumer of data points. The configuration device comprises at least one integrated circuit operative to automatically determine a communication configuration of data points for transmission of the required data points from the producers to the at least one consumer.

The configuration device may be adapted to perform the method of an embodiment.

The configuration device may be adapted to determine a transmission path for each of the required data points, based on protocols supported by the producers, the at least one consumer, and intermediate nodes along a transmission path from the producer to the at least one consumer.

The configuration device may be adapted to automatically determine protocol parameters and protocol services.

The configuration device may be adapted to identify protocols supported by nodes along at least one candidate transmission path from a producer of a required data point to the at least one consumer.

The configuration device may be adapted to select a transmission path based on the supported protocols.

The configuration device may be adapted to automatically generate configuration data for the nodes along at least one of the candidate transmission paths.

The configuration data may include configuration files.

The configuration device may be adapted to generate the configuration data based on a template.

The template may reflect a proprietary addressing scheme.

The configuration device may be adapted to determine the communication configuration of data points based on protocol stack capabilities.

The configuration device may be adapted to configure all communication links between the producer of a required data point and the at least one consumer concurrently.

The configuration device may be adapted to output data point information on data points that are available from at least one of the producers of data points.

The configuration device may be adapted to receive a user selection from the data point information.

The configuration device may be adapted to output the data point information such that it includes graphical markings indicating data points for which receipt by the at least one consumer is compulsory and data points for which receipt by the at least one consumer is optional.

The data points may include values of electric current.

The data points may include voltages.

The data points may include switch states.

The data points may include motor states of circuit breakers.

The data points may include a value and a time stamp.

The data points may include quality information.

The configuration device may be adapted to generate the communication configuration of data points when IEC 61850-based protocols are involved and when no IEC 61850-based protocols are involved.

The configuration device may be adapted to generate the configuration data for the producers, optional intermediate nodes, and the at least one consumer such that at least one required data point is transmitted using a protocol in accordance with IEC 61850 over at least part of its transmission path.

The configuration device may additionally or alternatively be adapted to generate the configuration data for the producers, optional intermediate nodes, and the at least one consumer such that at least another required data point is transmitted using a protocol that is not in accordance with IEC 61850 over at least part of its transmission path.

The configuration device may be adapted to determine the communication configuration of data points for the required data points prior to runtime of the industrial automation control system, power distribution system, power generation system, and/or power transmission system.

The configuration device may be adapted to determine the communication configuration of data points for the required data points prior to installation of the industrial automation control system, power distribution system, power generation system, and/or power transmission system.

The configuration device may be adapted to determine the communication configuration of data points for engineering, configuring or commissioning the industrial automation control system, power distribution system, power generation system, and/or power transmission system or subsystems or components thereof.

An industrial automation control system, power distribution system, power generation system, and/or power transmission system, comprises a plurality of producers of data points, at least one consumer of data points, and the configuration device according to an embodiment.

The at least one consumer may comprise a human machine interface.

The at least one consumer may comprise a control center.

The control center may be a device or system at which information of several substations and/or several power generation plants and/or several industrial plants is received and processed. The control center may be a device or system that is operative to control several substations and/or several power generation plants and/or several industrial plants.

The control center may be a national control center or a regional control center of a power system.

The control center may be a device or system that is operatively coupled to several gateways or human machine interfaces (HMI) to receive data points therefrom.

The producers of data points may comprise IEDs.

The producers of data points may comprise sensors.

The producers of data points may comprise merging units.

The producers of data points may be adapted to receive the configuration data generated by the configuration device.

The producers of data points may be adapted to transmit the required data points using a protocol defined by the configuration data.

Intermediate nodes of a transmission path for the required data points may be adapted to receive the configuration data generated by the configuration device The intermediate nodes may be adapted to receive the required data points using a protocol defined by the configuration data. The intermediate nodes may be adapted to transmit the required data points using a protocol defined by the configuration data. The protocols for receiving and transmitting may be different.

Various effects and advantages are attained by the method, device, and system according to embodiments.

The amount of human engineering work required for configuring data point communication or is reduced. By automatically determining the protocol configuration of data point transmission, the risk of errors is reduced. The protocol configuration of data point transmission can be determined again in an automatic manner when protocols change.

BRIEF DESCRIPTION OF THE DRAWINGS

The subject-matter of the invention will be explained in more detail with reference to preferred exemplary embodiments which are illustrated in the attached drawings, in which.

DETAILED DESCRIPTION OF ILLUSTRATIVE EMBODIMENTS

Exemplary embodiments of the invention will be described with reference to the drawings in which identical or similar reference signs designate identical or similar elements. While some embodiments will be described in the context of a power generation system or power distribution system, the methods and devices described in detail below may be used in a wide variety of system.

The features of embodiments may be combined with each other, unless specifically noted otherwise.

According to the invention, the transmission path for data points and the protocols used by servers in the producers of the data points, optional intermediate nodes, and the client in the consumer of the data points are automatically determined.

A user input may specify which producers provide which data points. A user input may specify which data points are required by which consumer. The consumer may be a peer device (e.g., interlocking), a human machine interface (HMI) or a superordinate control center, e.g., a national control center or regional control center of a power generation, distribution, and/or transmission system.

Information on supported protocols and basic protocol stack information may be used in the process of automatically determining the communication configuration of data points, i.e., in the process of determining the transmission paths and protocols that are to be used for each of the required data points.

The determination of the communication configuration may be limited to a subset of the overall available data points, i.e., those data points that are required by at least one consumer (which will be referred to as "required data points").

In the pertinent field of the art, the term "data point" refers to the smallest information unit that may be transmitted from an IED, merging unit (MU), sensor, etc. The data point may include a value and a time stamp. The data point may optionally include quality information.

Examples for data points include values of electric current, voltage, switch states, switch motor states, switch commands, transformer insulation parameters, transformer bushing parameters, etc. without being limited thereto.

References to a standard indicate refer to any version of the standard in effect on the earliest priority date.

Figure 1:
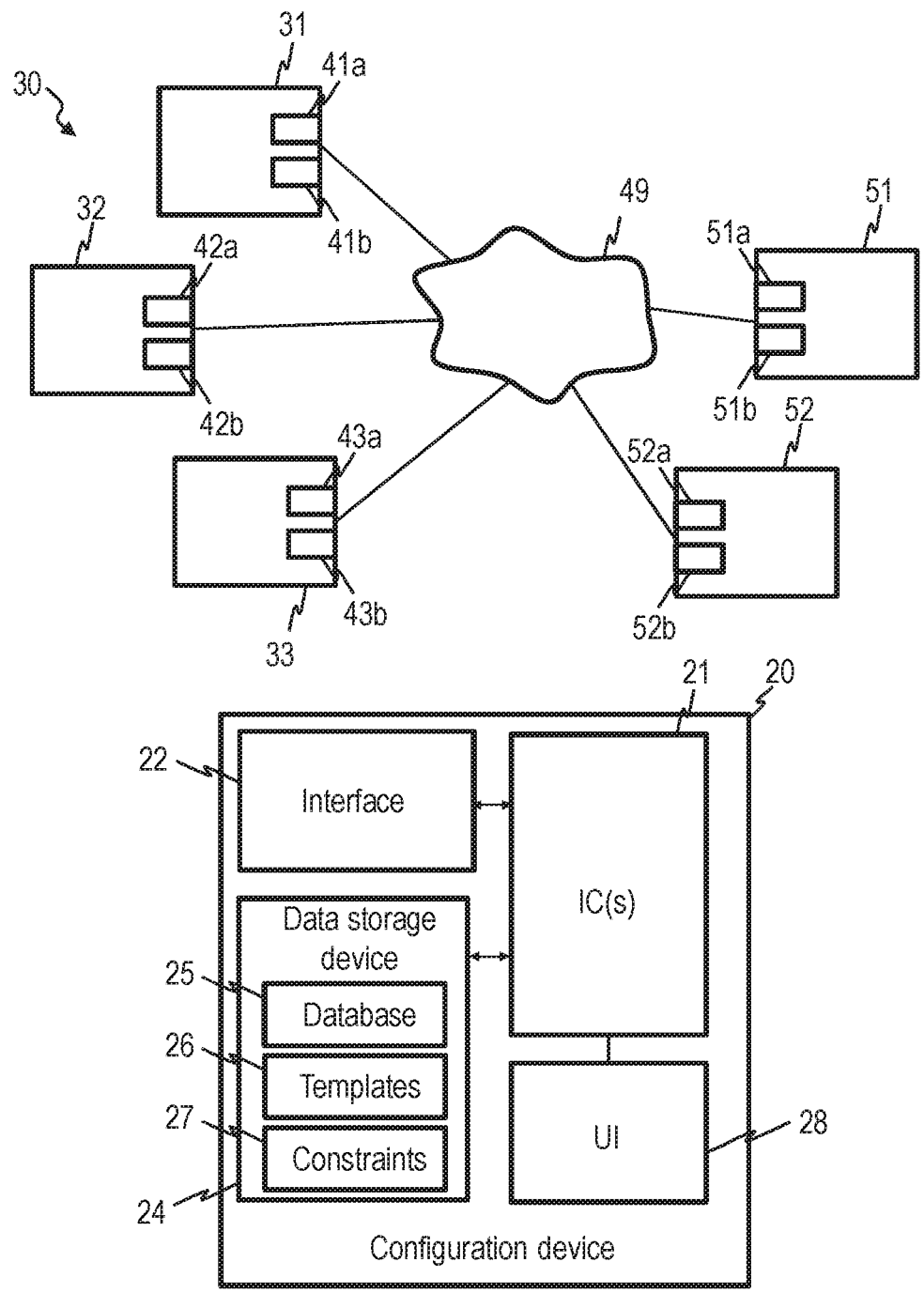
FIG. 1 is a schematic representation of a system comprising a configuration device according to an embodiment.

FIG. 1 is a schematic representation of a system according to an embodiment. The system comprises a plurality of producers 31, 32, 33 of data points, collectively referred to as data point producers 30. The data point producers 30 may respectively be merging units, intelligent electronic devices (IEDs) or other devices that provide data points relating to operation of an industrial automation control system (IACS), power generation system, power distribution system, and/or power transmission system. The data point producers 30 output the data in digital form.

As will be explained in more detail below, the producers 31, 32, 33 of data points may be adapted to transmit data points using one or several protocols supported by the producers 31, 32, 33 of data points. For illustration, a first producer 31 may support one or several protocols 41a, 41b for transmitting at least one data point over a network 49. A second producer 32 may support one or several protocols 42a, 42b for transmitting at least one data point over the network 49. A third producer 33 may support one or several protocols 43a, 43b for transmitting at least one data point over the network 49.

A consumer 51 or several consumers 51, 52 may require some, but not all of the data points that can be provided by the producers 31, 32, 33. The consumer(s) 51, 52 may be a local HMI or a national control center (NCC) or regional control center. The control center may be a superordinate control center at which information of several substations and/or several power generation plants and/or several industrial plants is received and processed. The control center may be a device or system that is operative to control several substations and/or several power generation plants and/or several industrial plants.

The consumer(s) 51, 52 may require data points that are relevant for monitoring the condition of an IACS, power transmission system, power distribution system, and/or power generation system, so as to ensure safe operation thereof. The consumer(s) 51, 52 may require data points that are relevant for controlling operation of the IACS, power grid, and/or power generation system.

A client in the consumer 51 may support one or several protocols 51a, 51b for receiving data points. A client in the consumer 52 may support one or several protocols 52a, 52b for receiving data points. The protocols 52a, 52b may be different from the protocols 51a, 51b or may include common protocols.

A configuration device 20 according to an embodiment is adapted to automate the protocol configuration of the data points. This may include determining transmission paths for data points and protocols to be used along each link of the transmission path.

The configuration device 20 may use data point lists to automate the protocol configuration of the data points. The data point lists may be fairly standardized for each operator of an IACS or power system. The configuration device 20 may use information on basic protocol stack capabilities automate the protocol configuration of the data points, in particular of the producers and consumers of the data points and optional intermediate nodes along the transmission path. The configuration device 20 may optionally use templates with user-specific implementations not determined by the data point lists and the basic protocol stack capabilities to automate the protocol configuration of the data points. Proprietary addressing schemes are one example for such user-specific implementations.

The configuration device 20 may be operative to automate the protocol configuration of the data points using input information that specifies which data points are required by the consumer(s) 51, 52. This ensures that the protocol configuration can be limited to the data points that are required by the consumer(s) 51, 52. This minimizes the risk of missing data points in the configuration process and obviates the need for determining a data point protocol configuration for data points that are not required by any one of the consumer(s) 51, 52 of data points.

The configuration device 20 can allow all links between producers 31, 32, 33 and consumer(s) 51, 52 to be configured concurrently, thereby reducing the risk of errors.

The configuration device 20 generally includes an interface 22 that is operable to output configuration data, such as control blocks or configuration files, for the producers 31, 32, 33, the consumer(s) 51, 52, and optional intermediate nodes in the network 49. The configuration data may define the transmission path for each of the data points required by the consumer(s) 51, 52 and the protocols used along the links of the transmission path.

Thereby, the configuration device 20 may generate the control information (e.g., configuration files or control blocks) that determines what is transmitted (e.g., which data points are transmitted) and how the transmission is done (i.e., along which transmission path the data points are transmitted and which protocols are used).

The configuration device 20 may include at least one integrated circuit 21. The at least one integrated circuit may comprise a processor, a microprocessor, a controller, a microcontroller, and application specific integrated circuit (ASIC) or any combination thereof. The at least one integrated circuit 21 may be operative to determine the communication configuration of data points for the required data points.

The configuration device 20 may include a user interface 28. The configuration device 20 may receive information on the data points that are required by the consumer(s) 51, 52 via the user interface 28. The configuration device 20 may use information on which data points are required by the consumer(s) 51, 52 and protocols supported by the data point sources and nodes in the network 49 (such as switches) to determine which transmission path is to be used and which protocol is to be used on each link of the transmission path. This information on the required data points may be received at the configuration device 20 via the user interface 28.

As used herein, the term "required data points" refers to data points that are required for the consumer(s) 51, 52 to operate as desired by the operator of the consumer(s) 51, 52. The "required data points" include data points that are compulsory (e.g., for legal or technical reasons) for the consumer(s) 51, 52 to operate in a correct manner; such data points include security-related data points that must be known to the consumer(s) 51, 52 to ensure correct and safe operation of the IACS, power generation system, power distribution system, and/or or power transmission system; and data points that are desired by the operator for the consumer(s) 51, 52, e.g., for monitoring or analytics purposes.

The IC(s) 21 of the configuration device 20 may allow a user to configure what data points can be provided by which source 31, 32, 33 (e.g., by engineering a Bay-level IED with a logic which provides data points), what data points are required by which consumer 51, 52 (e.g. for displaying in an alarm and/or event list by classifying them appropriately, for visualization on a picture by inserting symbols or widgets which specify certain data points as input, or by other bay-level IEDs for interlocking), and which sources 31, 32, 33, consumer(s) 51, 52, and intermediate nodes provide which protocols as server and/or as client.

Some of this information may be provided via the user interface 28 and/or may be read in via interface 22. For illustration, information on which data points can be provided by which source 31, 32, 33 may be available from a configuration description of IEDs that form the sources 31, 32, 33. The configuration description may be read in via interface 22. The configuration description may be a standardized configuration description, e.g., in accordance with IEC 61850. The configuration description may be different form an IEC 61850-conformant configuration description and may be, e.g., a proprietary configuration description.

Alternatively, information on the data points that can be provided by the sources 31, 32, 33 may also be input via user interface 28.

The configuration device 20 has a non-volatile storage device or memory 24. The storage device or memory 24 may store a database 25 that includes, e.g., information on which protocols are suitable for transmission of data points, which types of IEDs support which types of protocols as servers and clients, which data points are time-critical, etc. This information may be taken into consideration when automatically determining the data point protocol configuration for the required data points.

The storage device or memory 24 may store one or several templates 26. The one or several templates 26 may be used by the IC(s) 21 to generate configuration data, which may be configuration files, control blocks, or other configuration data. The templates 26 may be particularly useful when the operator of the IACS, power generation system, power distribution system and/or power transmission system uses a proprietary addressing scheme, for example. The templates may then be used for generating the configuration data, e.g., using naming conventions defined by the template. If no template 26 is to be used, default logics may be employed.

The storage device or memory 24 may store constraints 27. The constraints 27 may be taken into consideration by the configuration device when automatically determining the data point protocol configuration. For illustration, the constraints may specify which telegram types (e.g., according to IEC 104) are implemented by IEDs 31, 32, 33 and the consumer(s) 51, 52.

The configuration device 20 is generally operable to determine transmission paths of data points and the protocols used along each link of a transmission path from the sources 30 to the consumer(s) 51, 52 in an automated manner. If several options are available for transmission paths and/or protocols for one or several of the data points, the configuration device 20 may allow an engineer to specify which one of the options is to be selected via the UI 28. Alternatively or additionally, the configuration device 20 may automatically select one of the available options based on, e.g., pre-defined user preferences, a preference metric, or other conflict resolution schemes. When several candidate transmission paths are available, it is preferably to have an engineer specify which one of the candidate transmission paths are to be used, e.g., via the UI 28.

In order to perform the automated data point protocol configuration, the configuration device 20 may start from a list of data points that is required by the consumer(s) 51, 52. The automated data point configuration may be limited to the required data points.

The configuration device 20 may determine, for each of the required data points, which source 31, 32, 33 provides the respective data point. The information on the source may be inherent in the specification of the required data point. For illustration, the UI 28 may provide a graphical representation that allows a user to specify for each of the sources 31, 32, 33 which data points are required by the consumer(s) 51, 52.

The configuration device 20 may determine possible transmission paths. The determination may use information on the protocols that the data source providing the required data point supports when acting as a server, information on the protocols that switches or other nodes in the communication network 49 support when acting as client and when acting as server, and information on the protocols that the consumer(s) 51, 52 requiring the data point uses when acting as client. This protocol information may be dependent on the software or firmware on these devices and is known when configuring the data point communication. This protocol information may also be dependent on interfaces of the IEDs 31, 32, 33 and consumer(s) 51, 52.

When determining possible transmission paths and the protocols used along each link of the transmission path for the data point, the configuration device 20 may filter out protocols that are unsuitable for the require data point. For illustration, some protocols that may not guarantee that the time constraints for transmission of a required data point are fulfilled, while other dedicated protocols (such as IEEE 1588 or protocols defined in IEC 61850) may ensure timely transmission. This may be particularly relevant for safety-related data points. The IC(s) 21 may determine possible transmission paths taking into account those protocols that are suitable for transmission of the required data point. Depending on the complexity of the network and the number of nodes, route search techniques (such as Dijkstra edge expansion) may be used to determine possible transmission paths.

As previously mentioned, when there are several possible transmission paths and/or several possible protocols along one or several links of a transmission path, the configuration device 20 may allow an engineer to perform a selection or the configuration device 20 may perform an automatic selection using, e.g., pre-defined preferences or other conflict resolution techniques.

When the transmission path and protocols for each link have been determined for each of the required data points, the configuration device 20 may automatically generate configuration data. The configuration data may specify, for each of the sources 31, 32, 33, what is to be transmitted (i.e., which data point) and how the data point is to be transmitted (i.e., using which protocol and to which next node the transmission is to be made). Similar configuration data may be automatically generated by the configuration device 20 for each intermediate along a transmission path for a required data point, and for the consumer(s) 51, 52 for receipt of the required data points.

The configuration data may be in the form of configuration files. The configuration data may include configuration blocks. The configuration data may be stored in the sources 31, 32, 33, intermediate nodes (e.g., switches) along the transmission paths, and the consumer 51 and may be used by these devices during operation of the IACS, power generation system, power distribution system, and/or power transmission system.

Figure 2:
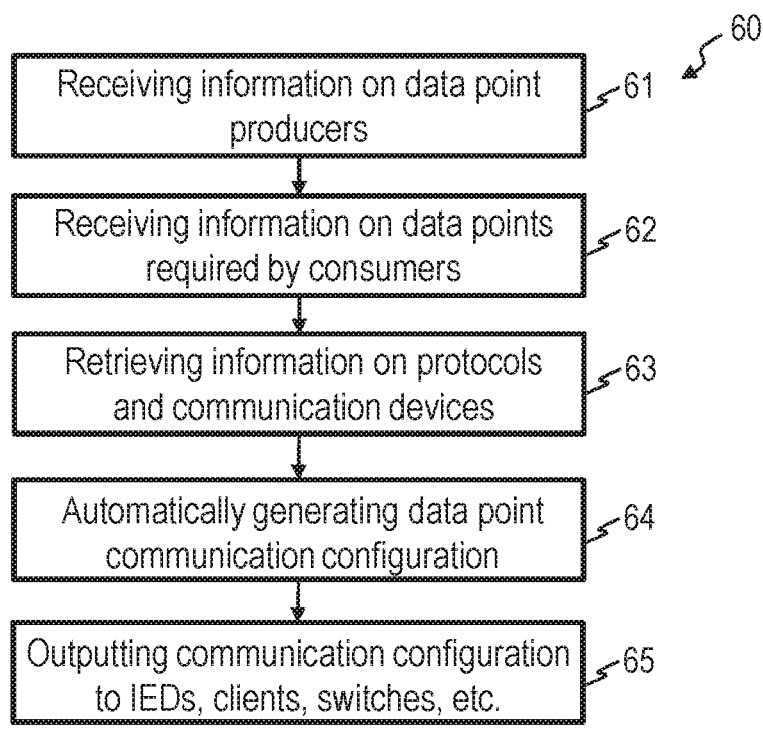
FIG. 2 is flow chart of a method according to an embodiment.

FIG. 2 is a flow chart of a method 60 according to an embodiment. The method 60 may be performed automatically by the configuration device 20.

At step 61, information on data point producers 30 is received. This information may specify what data points can be provided by which source 31, 32, 33. Some of this information may be provided via a user interface 28 and/or may be read in via interface 22 of the configuration device 20.

At step 62, information on data points required by one or several consumer(s) 51, 52 may be received. This information may be input via the user interface 28 of the configuration device 20. The information may be input using a graphical user interface that provides information on which data points are compulsory (e.g., for safety reasons) and which data points are optionally available from each data point source.

At step 63, information on which sources 31, 32, 33, consumer(s) 51, 52, and intermediate nodes provide which protocols as server and/or as client may be retrieved.

Retrieving this information may comprise receiving an input via the user interface 28 of the configuration device 20. The information may be retrieved via a data interface, e.g., by reading in a configuration file. At least part of the information may be stored locally in the configuration device 20 and may be read from the storage or memory device 24.

At step 64, a data point communication configuration for the data points may be automatically performed. This may include automatically determining transmission paths and protocols used along each link of a transmission path for each required data point. Step 64 may also comprise automatically determining parameters of protocols, if several parameters are available for certain protocols. Configuration files or other configuration data may be automatically generated, which define the transmission paths and protocols used for transmission of the data points.

The configuration files or other configuration data may be generated concurrently for all required data points. The risk of misconfigurations is thereby reduced further.

At step 65, the configuration data (e.g., control blocks or data sets) may be output. The configuration data may be stored in the IEDs of the IACS, power distribution system, power generation system, and/or power transmission system.

Figure 3:
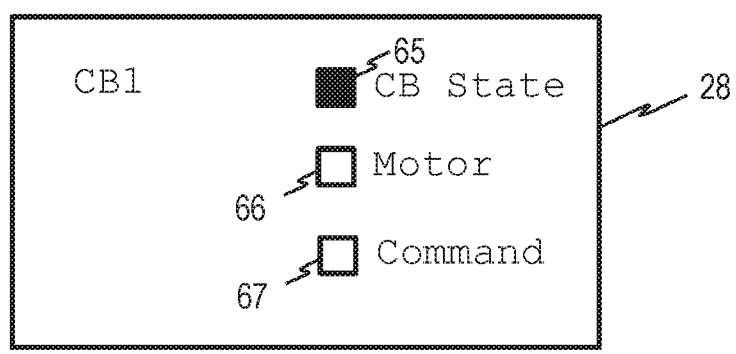
FIG. 3 is a schematic representation of a user interface of a configuration device according to an embodiment.

FIG. 3 is a schematic representation of a graphical UI 28. The configuration device 20 may output, via the UI 28, graphical indications that specify for each data point source which data points can be provided by that source. The graphical indications may indicate for which data points receipt by the consumer 51 is compulsory. For illustration, a circuit breaker state may be so relevant for safe operation of a power system that a graphical marking 65 indicates that this data point is automatically included in the list of required data points.

Receipt of other data points by the consumer 51 may be optional. Graphical markings 66, 67 may indicate that these other data points (such as a motor state of a circuit breaker) are available from the source, which may be a circuit breaker CB1. The graphical markings 66, 67 may also allow a user to select the data points. User selection causes the data points to be included in the list of required data points.

Figure 4:
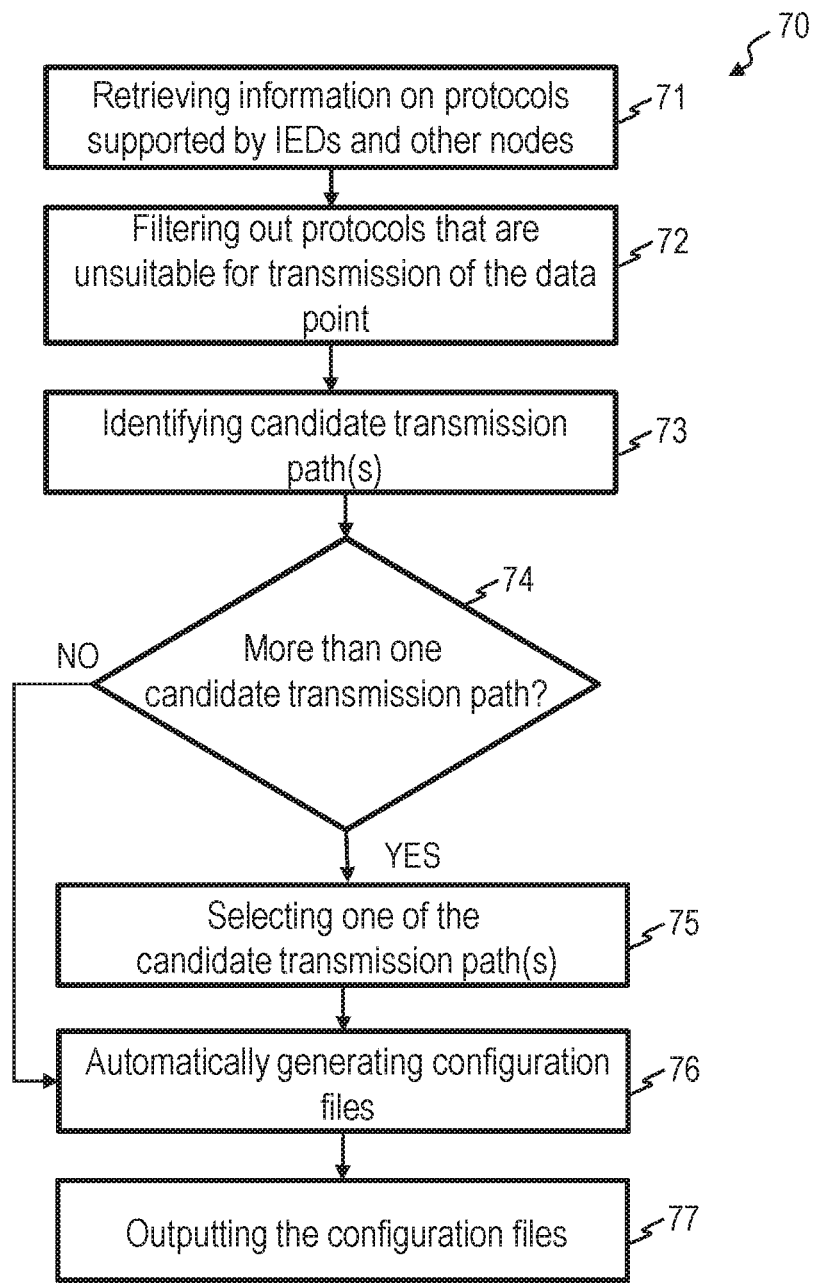
FIG. 4 is flow chart of a method according to an embodiment.

FIG. 4 is a flow chart of a method 70 according to an embodiment. The method 70 may be performed automatically by the configuration device 20. The method 70 may be performed to implement the automatic data point protocol configuration at step 63 of the method 60.

At step 71, information on protocols provided by IEDs as clients and servers is retrieved. The protocol-related information may be based on software or firmware executed on the IEDs. The protocol-related information may be read in from a configuration description or may be received via a UI.

At step 72, protocols that are unsuitable for transmission of data points may be filtered out.

At step 73, candidate transmission paths may be identified, taking into consideration those protocols that are suitable for transmission of the required data points.

At step 74, it is determined if there is more than one candidate transmission path for the required data point. If there is more than one candidate transmission path, one of the candidate transmission paths may be selected at step 75. This may be done automatically or based on a query via UI 28.

At step 76, configuration data (e.g., configuration files, data point communication configuration, protocol stack communication configuration, control blocks or data sets)

may be automatically generated. The generation of the configuration data may be done concurrently for all required data points.

At step 77, the configuration data may be output. This may be done when configuring or commissioning the IACS, power generation system, power distribution system, or power transmission system.

Figure 5:
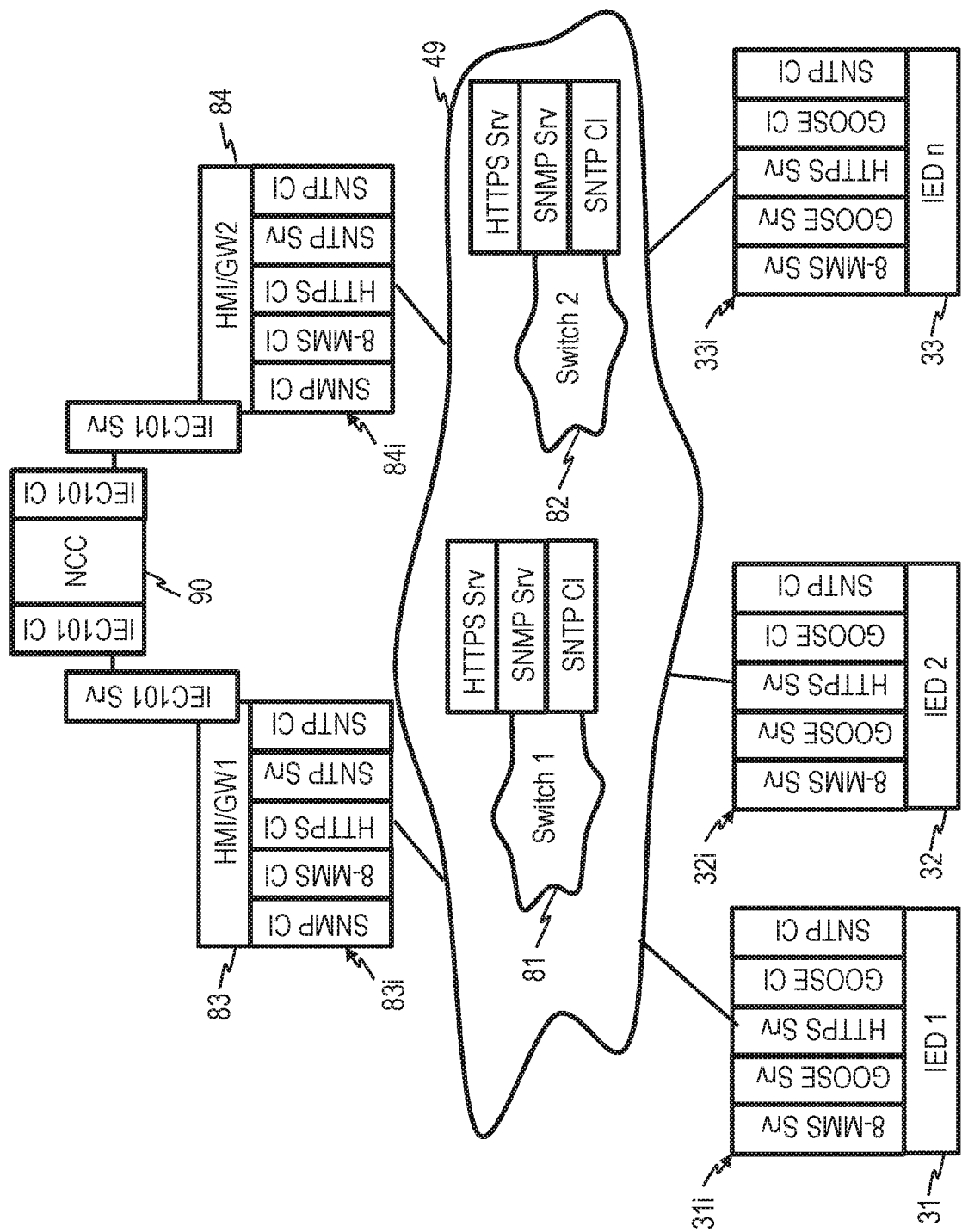
FIG. 5 is a schematic representation of a system comprising a configuration device according to an embodiment.

FIG. 5 is a schematic representation of a system according to an embodiment.

A first source 31, which may be a first IED, provides plural protocols 31*i*. A second source 32, which may be a second IED, provides plural protocols 32*i*. An nth source 33, which may be an nth IED, provides plural protocols 33*i*. The protocols supported by the various sources 31, 32, 33 may be different from each other. While only three sources are illustrated in FIG. 5, the number of sources may be much greater, e.g., in excess of 100 or even in excess of 1000.

HMI/Gateways (GW) devices 83, 84 may support protocols 83*i*, 84*i*.

A national control center (NCC) 90 may support a protocol such as IEC 101 and optional other protocols.

Switches 81, 82 in the communication network 49 may support still other protocols.

In FIG. 5, the letters "Srv" respectively indicate that the protocol is supported by the IED when acting as server, and the letters "Cl" indicate that the protocol is supported by the IED when acting as client.

Operation of the configuration device 20 will be explained with exemplary reference to the system of FIG. 5.

The HMI/GW devices 83, 84 can each require several data points, e.g., in excess of 100 data points, from each IED 1 . . . n 31-33. The data points may be required for event and alarm listing, for showing a state of the process in graphics, or for both. The data points that are required may be dependent by the graphics created by the devices 83, 84 and by customer specification (e.g., for alarm/event listing).

A subset of these data points can be required on the NCC 90 for remote control and supervision (e.g., ten data points or in excess of ten data points for each IED 31-33).

The configuration device 20 may first verify that the required data points are available from the respective IED 31, 32, 33. If the required data points are not available, the logic would have to be modified and a corresponding warning may be output. If the data points are produced by the IEDs 31, 32, 33, the configuration device 20 analyzes the communication. This includes the services, i.e. software components executed on each device 31, 32, 33, 83, 84, 90 which can provide (servers) or receive data points (clients). This information is known at the project stage at which the data point protocol configuration is determined, as the devices need to be ordered to provide those services.

The configuration device 20 can automatically filter out all protocols which are not suitable for data point transmission. For illustration, HTTPS may be determined to be unsuitable for data point transmission. For the exemplary system of FIG. 5, the configuration device 20 can determine that the only way to send data points from the IEDs 31, 32, 33 to the HMI/GW devices 83, 84 is 8-MMS (one of the protocols of the IEC 61850 standard). The configuration device 20 can determine that the only way to send data points from the HMI/GW devices 83, 84 to the NCC 90 is via IEC 101. If there are several possible protocols, either the preferred one can be chosen, or the engineer can be queried.

8-MMS is a semantically defined protocol. A lookup can provide the identification strings of the protocol matching the individual data points. Such lookup can be provided by database 25 or may be retrieved from an external database.

The configuration device 20 creates the data sets/control blocks for the specific protocol and creates configuration files for the servers on the IEDs 31, 32, 33 and clients on the HMI/GW devices 83, 84.

If the configuration device 20 determines that there are two or more ways to send the information to the NCC 90, an engineer can specify whether one or both ways shall be used.

The configuration device 20 can provide the configuration for the data points to be sent via IEC 101. This can again be done in a fully automatic manner, unless the customer specifies an address scheme to be followed which would need to be provided via template 26.

Assuming twenty IEDs 31-33 and 120 data points per IED, 2400 Data Points to the HMI/GW devices 83, 84 and the further provision to the NCC 90 could be essentially configured automatically with minimum engineer interaction. Even if a small percentage of the data point protocol configuration would still need some individual engineer input, the configuration device 20 still results in considerable time saving and reduced error probability.

According to embodiments of the present invention, the whole protocol-specific information for data points required by consumers 83, 84, 90 can be calculated from their point of origin 31, 32, 33 to their points of consumption 83, 84, 90. This applies both when the transmission path is via one single communication link or via several links (e.g. via a gateway 83, 84 to a remote control center 90 as illustrated in FIG. 5). The configuration files for each protocol server/client of the system can be automatically generated.

If the operator of the IACS, power generation system, power distribution system, or power transmission system has an own addressing scheme based on semantics (e.g. German Utilities for IEC 104 or IEC 61850 Flexible Product Naming), this can be configured as a template 26. The template can be stored per system operator, i.e., per customer of a configuration/commissioning service.

If there is a customized template for an operator of the IACS, power generation system, power distribution system, or power transmission system, the determination of the protocol-specific information for data points may be based on a template 26 rather than on default logics.

Various effects and advantages are attained by the devices, methods, and systems according to embodiments. For illustration, engineering can be made more efficient by automation of the data point protocol configuration.

The risk of incorrect configuration is reduced. For illustration, horizontal communication between IEDs, e.g. for interlocking, can be automated and can be performed in a reproducible manner due to the automation.

The engineering tasks for the data point protocol configuration can be performed intuitively. The engineer only has to configure things which he is familiar with and knows, such as which data points are provided by which IED and which data points are required by which consumer. The engineer does not have to specify parameters which require relatively special knowledge and change much more often; while following fairly strict rules, such as protocols.

The risk of errors during configuration is reduced. This reduces the amount of testing, which is currently a significant cost factor.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

What is claimed is:

1. A method of configuring communication of a set of data points from producers of data points of an industrial automation control system, power distribution system, power generation system, and/or power transmission system to a consumer of data points, the method comprising:
  receiving, by a configuration device, information on required data points, the required data points being a subset of all available data points and being the set of data points required by the consumer of data points; and
  automatically determining, by the configuration device, a communication configuration of data points for transmission of the required data points from the producers to the consumer, wherein the automatically determining comprises determining a transmission path for each of the required data points based on protocols supported by the producers, the consumer, and nodes traversed on the transmission path from a producer to the consumer; and
  automatically generating and outputting, by the configuration device, configuration data for the producer of a required data point and/or nodes traversed on the transmission path from the producer of a required data point to the consumer.

2. The method of claim 1, wherein automatically determining the communication configuration of data points comprises automatically determining protocol parameters and protocol services.

3. The method of claim 1, wherein automatically determining the communication configuration of data points comprises identifying protocols supported along a candidate transmission path from a producer of a required data point to the consumer.

4. The method of claim 3, further comprising automatically generating configuration data for nodes along the candidate transmission path.

5. The method of claim 4, wherein the configuration data are generated based on a template.

6. The method of claim 5, wherein the template reflects a proprietary addressing scheme.

7. The method of claim 3, wherein the communication configuration of data points is determined based on protocol stack capabilities.

8. The method of claim 3, wherein all communication links between the producer of a required data point and the consumer are configured concurrently.

9. The method of claim 1, wherein the consumer comprises a human machine interface.

10. The method of claim 9, wherein the consumer comprises a control center.

11. The method of claim 10, wherein the control center is a national control center or a regional control center of a power system.

12. The method of claim 1, further comprising outputting data point information on data points that are available from at least one of the producers of data points, wherein receiving the information on required data points comprises receiving a user selection from the data point information.

13. The method of claim 12, wherein the data point information includes graphical markings indicating data points for which receipt by the consumer is compulsory and data points for which receipt by the consumer is optional.

14. A configuration device adapted to configure communication of a set of data points from producers of data points of an industrial automation control system, power distribution system, power generation system, and/or power transmission system, the configuration device comprising:
  an interface operative to receive information on required data points, the required data points being a subset of all available data points and being the set of data points required by a consumer of data points; and
  at least one integrated circuit operative to:
    automatically determine a communication configuration of data points for transmission of the required data points from the producers to the consumer, wherein the automatically determining comprises determining a transmission path for each of the required data points based on protocols supported by the producers, the consumer, and nodes traversed on the transmission path from a producer to the consumer, and
    automatically generate and output configuration data for the producer of a required data point and/or nodes traversed on the transmission path from the producer of a required data point to the consumer.

15. The configuration device of claim 14, wherein the at least one integrated circuit is operative to automatically determine by identifying protocols supported along a candidate transmission path from a producer of a required data point to the consumer.

16. An industrial automation control system, power distribution system, power generation system, and/or power transmission system, comprising:
  a plurality of producers of data points;
  a consumer of data points, the consumer in need of a set of data points; and
  a configuration device comprising an integrated circuit,
  the configuration device configured to receive information on required data points, the required data points being a subset of all available data points and being the set of data points needed by the consumer of data points, when the configuration device is further configured to: automatically determine a communication configuration of data points for transmission of the required data points from the producers to the consumer, wherein the automatically determining comprises determining a transmission path for each of the required data points based on protocols supported by the producers, the consumer, and nodes traversed on the transmission path from a producer to the consumer, and automatically generate and output, by the configuration device, configuration data for the producer of a required data point and/or nodes traversed on the transmission path from the producer of a required data point to the consumer.

17. The system of claim 16, wherein the configuration device comprises:
  an interface operative to receive information on the required data points; and
  at least one integrated circuit operative to automatically determine the communication configuration of data points for transmission of the required data points from the producers to the consumer.

18. The system of claim 16, wherein the consumer of data points is a national control center or a regional control center of a power system.

19. The system of claim 16, wherein the consumer comprises a human machine interface.

20. A non-transitory memory storage for configuring a communication of a set of data points from producers of data points of an industrial automation control system, power distribution system, power generation system, and/or power transmission system to a consumer of data points, the non-transitory memory storage comprising instructions which, when executed by at least one integrated circuit of a configuration device, cause the configuration device to perform the method of:
- receiving, by the configuration device, information on required data points, the required data points being a subset of all available data points and being the set of data points required by the consumer of data points;
- automatically determining, by the configuration device, a communication configuration of data points for transmission of the required data points from the producers to the consumer, wherein the automatically determining comprises determining a transmission path for each of the required data points based on protocols supported by the producers, the consumer, and nodes traversed on the transmission path from a producer to the consumer; and
- automatically generating and outputting, by the configuration device, configuration data for the producer of a required data point and/or nodes traversed on the transmission path from the producer of a required data point to the consumer.

\* \* \* \* \*